(12) United States Patent
Nordin

(10) Patent No.: US 7,411,405 B2
(45) Date of Patent: Aug. 12, 2008

(54) METHOD AND APPARATUS FOR RELIABLE NETWORK CABLE CONNECTIVITY

(75) Inventor: Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/423,809

(22) Filed: Jun. 13, 2006

(65) Prior Publication Data

US 2006/0281359 A1 Dec. 14, 2006

Related U.S. Application Data

(60) Provisional application No. 60/690,150, filed on Jun. 14, 2005, provisional application No. 60/690,149, filed on Jun. 14, 2005, provisional application No. 60/624,753, filed on Nov. 3, 2004.

(51) Int. Cl.
G01R 31/04 (2006.01)
G01R 31/02 (2006.01)
G01R 19/00 (2006.01)

(52) U.S. Cl. .................... 324/538; 324/539; 324/66

(58) Field of Classification Search ............... 324/538, 324/539, 66
See application file for complete search history.

(56) References Cited

U.S. PATENT DOCUMENTS

| | | | |
|---|---|---|---|
| 3,378,810 A | 4/1968 | Dorrell | |
| 3,458,851 A | 7/1969 | Webb | |
| 4,281,888 A | 8/1981 | Seaman | |
| 4,560,926 A | 12/1985 | Cornu et al. | |
| 4,736,195 A | 4/1988 | McMurtry et al. | |
| 4,824,378 A | 4/1989 | Betz | |
| 4,896,117 A * | 1/1990 | Floweredew et al. | ........ 324/520 |
| 5,009,613 A | 4/1991 | Langgard et al. | |
| 5,032,787 A | 7/1991 | Johnston et al. | |
| 5,227,718 A | 7/1993 | Stowers et al. | |
| 5,391,995 A | 2/1995 | Johnston et al. | |
| 5,402,073 A | 3/1995 | Ross | |
| 5,456,621 A | 10/1995 | Gan | |
| 5,497,460 A | 3/1996 | Bailey et al. | |
| 5,559,427 A | 9/1996 | Hinds et al. | |
| 5,570,029 A * | 10/1996 | Bottman et al. | ............. 324/628 |

(Continued)

FOREIGN PATENT DOCUMENTS

JP  7301654  11/1995

*Primary Examiner*—Vincent Q. Nguyen
*Assistant Examiner*—Amy He
(74) *Attorney, Agent, or Firm*—Robert A. McCann; Zachary J. Smolinski (57) ABSTRACT

Methods and apparatus establish and maintain reliable network cable contacts that mitigate disconnecting effects by transmitting an AC signal with a frequency that reduces the disconnecting effects. The signal frequency may be statically or dynamically selected. The approach allows the severity of a disconnecting effect to be assessed and/or monitored and may support the scheduled replacement and/or repair of network cables identified as faulty. Information related to network cable resistance may be managed within the local device and/or with assistance from a Network Management System (NMS). Physical connection reliability and resilience against disconnecting effects is further enhanced with a physical pogo-style connector that rotates to mechanically scrape and remove oxidation and debris from a conductive contact pad surface each time a physical contact is formed. Such a contact may significantly reduce the level of oxidation, oils and other debris that contribute to the disconnecting effect.

3 Claims, 6 Drawing Sheets

U.S. PATENT DOCUMENTS

| | | |
|---|---|---|
| 5,576,631 A | 11/1996 | Stowers et al. |
| 5,641,315 A | 6/1997 | Swart et al. |
| 5,731,710 A | 3/1998 | Mizuno et al. |
| 5,936,421 A | 8/1999 | Stowers et al. |
| 5,942,906 A | 8/1999 | Stowers et al. |
| 5,993,269 A | 11/1999 | Ito |
| 6,058,137 A * | 5/2000 | Partyka ................. 375/131 |
| 6,166,760 A | 12/2000 | Kay |
| 6,169,475 B1 | 1/2001 | Browning |
| 6,493,200 B1 | 12/2002 | Farmer et al. |
| 6,515,485 B1 | 2/2003 | Bullock et al. |
| 6,685,492 B2 | 2/2004 | Winter et al. |
| 6,716,043 B2 | 4/2004 | Ishizuka |
| 6,906,526 B2 * | 6/2005 | Hart et al. .................. 327/527 |
| 7,106,071 B2 * | 9/2006 | Pharn et al. ................ 324/539 |
| 2003/0006881 A1 | 1/2003 | Reyes |
| 2003/0043038 A1 | 3/2003 | Izadinia et al. |
| 2003/0107482 A1 | 6/2003 | Kim |
| 2004/0178801 A1 | 9/2004 | Hart, Jr. et al. |

* cited by examiner

METHOD AND APPARATUS FOR RELIABLE NETWORK CABLE CONNECTIVITY

CROSS-REFERENCE TO RELATED APPLICATIONS

This application claims the benefit of U.S. Provisional Application No. 60/690,150, filed on Jun. 14, 2005. This application incorporates by reference in its entirety U.S. Provisional Patent Application No. 60/624,753, entitled "Method and Apparatus for Patch Panel Patch Cord Documentation and Revision," filed on Nov. 3, 2004, and U.S. Provisional Patent Application No. 60/690,149, entitled "Method and Apparatus for Monitoring Physical Network Topology Information." filed on Jun. 14, 2005.

BACKGROUND OF THE INVENTION

1. Field of Invention

The present invention pertains to network cable management.

2. Description of Related Art

One of the most difficult problems faced by network managers is the effect of poor electrical connections within network cable connectors.

SUMMARY OF THE INVENTION

Preferably, upon insertion of a network cable terminator into a port on a network connected device, a highly reliable physical and electrical connection may be formed between each conductor within the network cable and the respective port contacts. Unfortunately, even though strong physical contact may be established by the network cable at the network connected device port, the electrical connection formed between one or more of the network cable conductors and their respective port contacts may not be adequate. For example, the surface contacts may include surface oxidization, oil and/or other debris that prevents a conductor from establishing sufficient electrical contact. Further, such oxidation and debris may build upon conductor leads over time, eventually resulting in a degraded connection contact, or a loss of connection. Such degraded and/or blocked connections may significantly affect the reliability of the network cable connection. Hence, a need remains for techniques to assure that network cable connections are reliable.

Methods and apparatus are disclosed for establishing and maintaining reliable network cable contacts that mitigate disconnecting effects, such as oxidation upon network cable connection contacts (i.e., a capacitive contact), by transmitting an AC signal with a frequency that reduces the disconnecting effects, such as reactance of a capacitive contact to AC signal electrical current flow. The signal frequency may be statically or dynamically selected. The approach allows the severity of a disconnecting effect to be assessed and/or monitored and may support the scheduled replacement and/or repair of network cables identified as faulty. Information related to network cable resistance may be managed within the local device and/or with assistance from a Network Management System (NMS). Physical connection reliability and resilience to disconnecting effects is further enhanced with a physical pogo-style connector that rotates to mechanically scrape/remove oxidation and debris from a conductive contact pad surface each time a physical contact is formed. Such a contact may significantly reduce the level of oxidation, oils and other debris that contribute to the disconnecting effect.

BRIEF DESCRIPTION OF THE DRAWINGS

Exemplary embodiments according to the present invention are described below with reference to the above drawings, in which like reference numerals designate like components.

DETAILED DESCRIPTION OF PREFERRED EMBODIMENTS

Figure 1:
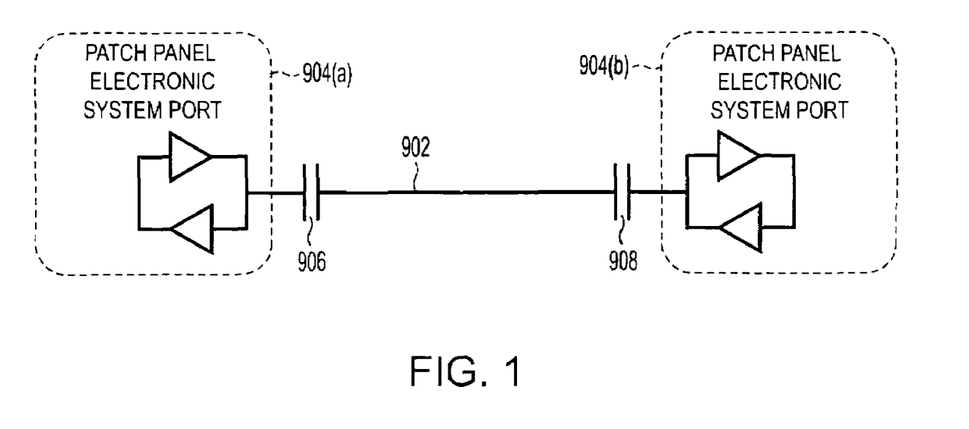
FIG. 1 is a schematic diagram of an exemplary network cable connection that demonstrates the capacitive effect of network cable contact oxidation.

FIG. 1 is a schematic diagram in which the disconnecting effects, described above, are modeled as a capacitance at each end of a network cable connection. Although the model depicts a network cable connection between two network patch panel devices, such disconnecting effects may form on any network cable connection. For example, exposure of network cable electrical contact leads and/or equipment jack, or port, electrical contact leads, to humidity and/or other environmental elements may result in oxidation of the conductive materials resulting in an electrically insulating oxide barrier forming upon portions of and/or upon entire surfaces of network cable terminator and/or port contact surfaces. To simplify the example. FIG. 1 omits the representation of resistive debris upon the contacts, which may occur in series and/or in parallel with the modeled capacitance.

As shown in FIG. 1, a network cable 902 forming a connection between a first patch panel port 904(*a*) and a second patch panel port 904(*b*), may experience a degradation in the quality of the network cable electrical connection due to contact oxidation capacitances 906 and 908 affecting the electrical connection of each of the respective network cable connections. A layer of insulating oxide may build up upon and act as a dielectric between the conductive contact surfaces of the cable terminator (e.g., an RJ-45 plug) and the conductive contact surfaces of the port within which the cable terminator is inserted, resulting in a capacitive contact. Many network systems are sensitive to the quality of the contact between the network cable and a network connected device. For example, a DC signal cannot penetrate a capacitive contact, and low frequency signaling cannot effectively communicate when a capacitive contact is in series with the communicating electronics.

The impedance to electric current flow created by a capacitive contact is inversely proportional to the frequency of the communication signal and may be modeled by Equation 1, presented below:

$$\frac{1}{2\pi f C} \quad \text{EQ. 1}$$

Wherein:
C is the capacitance of the capacitive contact; and
f is the frequency of the communication signal.

Capacitance C associated with two contact surfaces separated by a layer of oxidation may be modeled by Equation 2, presented below:

$$C = \frac{\varepsilon A}{d} \quad \text{EQ. 2}$$

Wherein:
ε is the dielectric constant of the oxide materials;
A is the area of the contact surfaces of the conductors; and
d is thickness of the dielectric oxide buildup on the conductors.

For example, based upon Equation 2, above, assuming that the oxidation material has a dielectric constant value (ε) of ten relative to the permittivity of air (i.e., 8.854×10$^{-14}$ F/cm), the capacitive area (A) is 0.1 cm by 0.1 cm, and the dielectric thickness (d) is 1×10$^{-4}$ cm, the capacitive connection has a capacitive value (C) equal to 10(8.854×10$^{-14}$ F/cm)(0.1 cm×0.1 cm)/(1×10$^{-4}$ cm), or 88.5 pF.

Further, based upon Equation 1, above, assuming a signal frequency of 1 MHz and a capacitance of 88.5 pF, the impedance of the representative capacitive contact may be calculated as 1/(2π)×(1×10$^{6}$)(88.5×10$^{-12}$)Ω or 1.798 kΩ.

Figure 2:
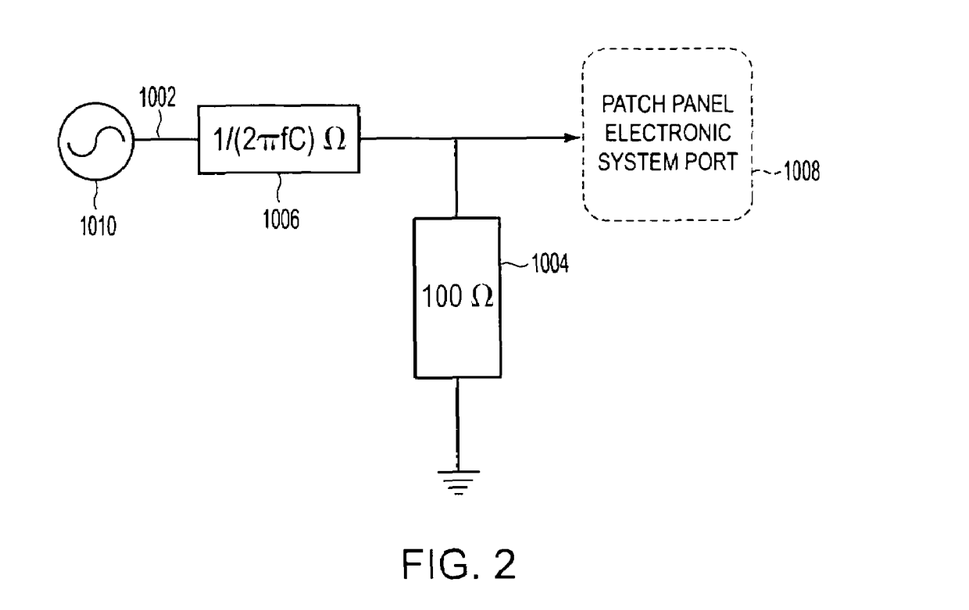
FIG. 2 is a schematic diagram of a patch panel network cable in which an AC signal is used to mitigate the impact of network cable contact oxidation.

FIG. 2 is a schematic diagram, or model, of a capacitive contact between a patch panel network cable 1002 and a single port 1008 on an exemplary patch panel electronic system, as described above with respect to FIG. 1. A shown in FIG. 2, the network cable uses a standard 100Ω termination resistance 1004. Due to oxidation on the conductive contact surfaces of the cable terminator and/or upon the contact surfaces of the port socket within which the network cable terminator is inserted, the model includes an impedance 1006. Further, as shown in FIG. 2, the signal transmitted via network cable 1002 is an AC signal 1010. As described below, use of an AC signal may be used to mitigate the impact of a capacitive contact upon the electrical path established by a network cable.

Based upon the Voltage Divider Rule, the magnitude of a transmitted signal voltage signal 1010 (e.g. Vs$_{transmitted}$) that is received (Vs$_{received}$) by a patch panel electronic system port 1008 across a termination resistance 1004 (R1) wherein the network cable has an impedance 1006 (R2) may be modeled by Equation 3, presented below:

$$Vs_{received} = \left(\frac{R1}{R1 + R2}\right) Vs_{transmitted} \quad \text{EQ. 3}$$

A significant portion of the signal voltage may be lost due to impedance 1006. For example, the signal voltage, as seen by patch panel electronic system port 1008 across 100Ω termination resistance 1004, may be modeled by the voltage divider equation 4, presented below:

$$Vs_{received} = \left(\frac{100\Omega}{100\Omega + \frac{1}{2\pi f C}\Omega}\right) Vs_{transmitted} \quad \text{EQ. 4}$$

Based upon Equation 3, assuming that the network cable system uses a 100Ω termination resistance, in order for Vs$_{received}$ to be greater than one percent (1%) of the original signal, the resistance represented by ½πfC would preferably be less than 9.9KΩ. Therefore, assuming that signal communication across a network cable conductor is driven at each patch panel port by a transceiver that is designed to transmit an AC signal with a magnitude of 0.25V across a network cable with a 100Ω termination resistance and assuming that the transceiver is capable of detecting/receiving a signal as small as 0.0025V, or 1% of the original signal, the resistance represented by ½πfC would preferably be less than 9.9 KΩ. Therefore, assuming that such a system is designed to accommodate a capacitive contact capacitance ranging from 88.5 pF to 32 pF, the frequency of the AC signal may be dynamically controlled to range from approximately 180 KHz to 500 KHz, respectively, or may be statically set to approximately 500 KHz. If dynamically controlled, the frequency of the AC signal may be determined based upon a measure of the magnitude, and/or phase, of the received signal and/or another related parameter. For example, the frequency of the AC signal may be increased in response to a decrease in the magnitude of the received signal, or in response to a detected change in the phase shift of the received signal.

The values and ranges described above are exemplary only. The AC signal frequency used to monitor the status and/or communicate across a network cable between two patch panels (or between any two network devices in which the described capabilities are included) may depend upon many factors which may include, but are not limited to, the termination resistance of the network cable, the magnitude of the originally transmitted signal (Vs$_{transmitted}$), the reception sensitivity of the port transceiver to detecting the transmitted signal as received (Vs$_{received}$), and the thickness and surface area characteristic of the corrosion (or oxidation) (i.e. the degree of contact capacitance) that the system is designed to overcome.

Any specific design, therefore, may include an assessment of such design parameters when determining the magnitude and the frequency of the signal that the transceiver is designed to transmit and receive. Nevertheless, the frequency of the AC signal transmitted upon a network cable conductor is preferably sufficiently high to allow a sufficiently strong signal to be received at the receiving port to which the network cable is attached, as described above.

Use of an AC signal upon a network cable connection may allow electrical connectivity to be established/maintained despite the presence of a capacitive contact, as described above. Despite the availability and use of such AC signal based techniques, however, an electrical connection may be improved by mechanically removing all or a portion of oxidation and debris that may have collected upon the conductor contact surfaces so that an improved metal-to-metal contact may be made. An electrical lead capable of mechanically removing all or a portion of oxidation and debris that may have collected upon the conductor contact surfaces is described below with respect to FIG. 3. Such an electrical lead may be used to improve any physical electrical contact regardless of whether a DC signal or an AC signal, as described above is used.

Figure 3:
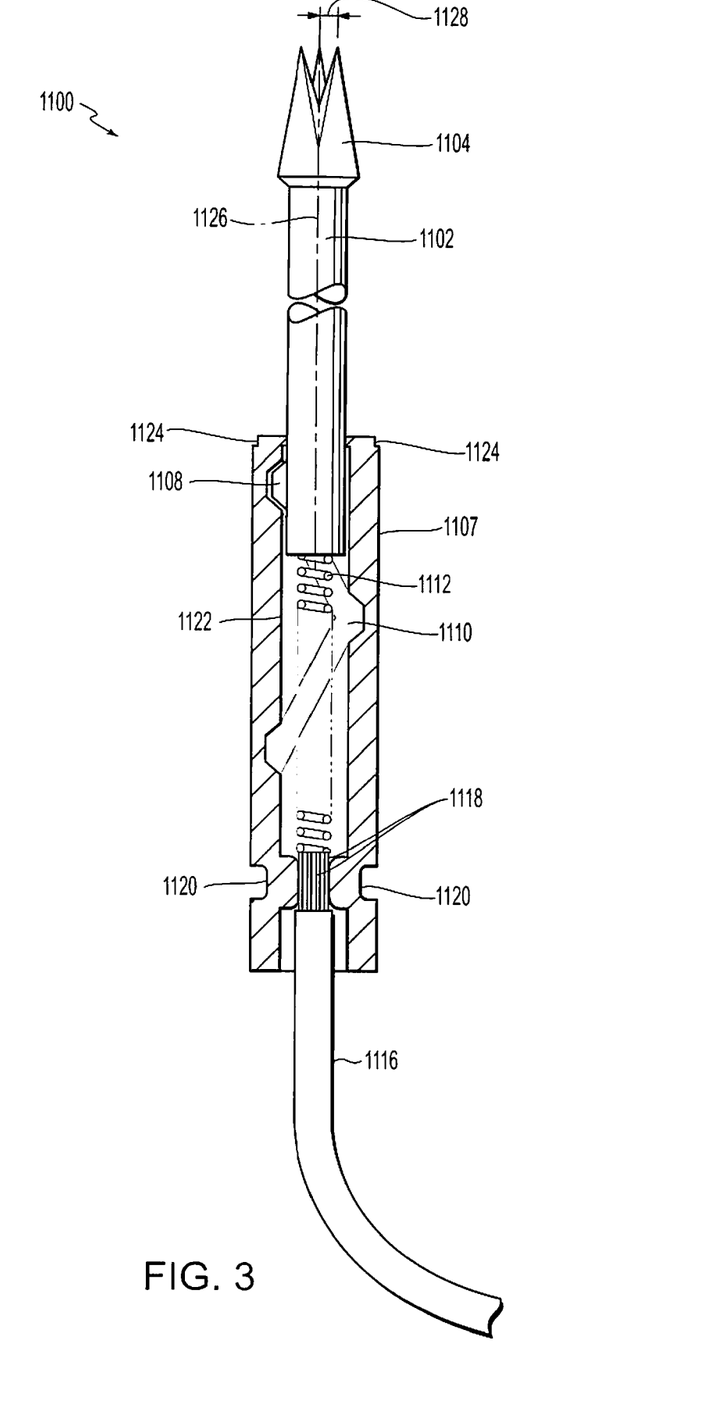
FIG. 3 is a partial cross-sectional view of an exemplary pogo-style connector that provides a reliable out-of-band channel physical contact.

FIG. 3 is a partial cross-sectional view of an exemplary pogo-style connector 1100 that may be used to provide a reliable out-of-band channel physical contact for use by an exemplary patch panel cable monitoring system. The exemplary pogo-style connector forms an electrical contact by compressing a spring-loaded tip of a conducting lead perpendicularly against an electrically conducting contact pad.

As shown in FIG. 3, pogo-style connector 1100 may include an electrically conducting cylindrical sleeve 1107 that may receive at one end a conductor 1116 and make electrical contact with conducting leads 1118 within conductor 1116. In one exemplary embodiment, an insulating sheath is removed from an end portion of conductor 1116 to expose electrically conducting leads 1118, which are then inserted into cylindrical sleeve 1107. A collapsible portion 1120 of cylindrical sleeve 1107 may then be crimped to form a tight electrical metal-to-metal connection between cylindrical sleeve 1107 and conducting leads 1118.

Electrically conducting cylindrical sleeve 1107 may further receive, at an end opposite the connection with conductor 1116, an electrically conducting contact lead 1102 with an electrically conducting contact surface, depicted in this exemplary embodiment as a multi-point contact surface 1104. Contact lead 1102 may be inserted within cylindrical sleeve 1107 in contact with and imparting force to a resilient member 1112, (e.g. a spring, elastic material, etc.) that exerts an equal force on the contact lead in direction toward the free end of the contact lead. A protrusion 1108 on the outer surface of contact lead 1102 may be aligned with a spiral groove 1110 etched into an inner surface of cylindrical sleeve 1107 and an end 1124 of cylindrical sleeve 1107 may be crimped after insertion of contact lead 1102 into conducting cylindrical sleeve 1107 so as to prevent resilient member 1112 from ejecting contact lead 1102 from cylindrical sleeve end 1124.

In use, upon compressing multi-point contact surface 1104 against a contact pad, contact lead 1102 retracts into cylindrical sleeve 1107. As contact lead 1102 retracts, protrusion 1108 follows spiral groove 1110, thus forcing contact lead 1102 to rotate about a center axis 1126 as contact lead 1102 retracts into cylindrical sleeve 1107, compressing spring 1112. Rotation of contact lead 1102 results in multi-point contact surface 1104 scraping against the conducting contact pad surface, thus allowing multi-point contact surface 1104 to scrape away debris and oxidation from the contact pad surface, and thus form an improved metal to metal contact.

Figure 4A:
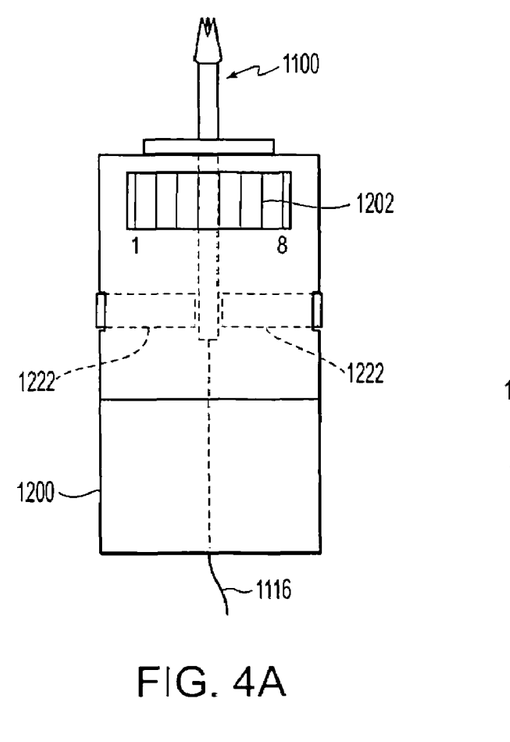
FIGS. 4A-4B are a bottom plan view and a front plan view, respectively, of an RJ-45 connector that includes the pogo-style out-of-band channel connector depicted in FIG. 3.
Figure 4B:
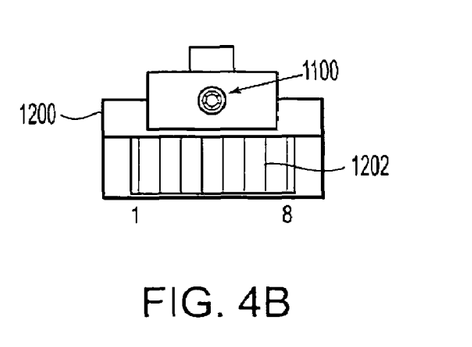

FIGS. 4A-4B are a bottom plan view and a front plan view, respectively, of an exemplary RJ-45 style connector that includes a pogo-style out-of-band channel connector as described above with respect to FIG. 3. As shown in FIG. 4A-4B, pogo-style connector 1100 may be inserted within an RJ-45 style connector 1200 without disturbing the configuration of standard RJ-45 connectors 1202. Pogo-style connector 1100 may be connected to a conductor 1116, as described above, and then inserted into RJ-45 style connector 1200, held in place by a tight friction fit and/or locked in place by a known locking device 1222 against the pogo-style connector 1100.

Figure 5A:
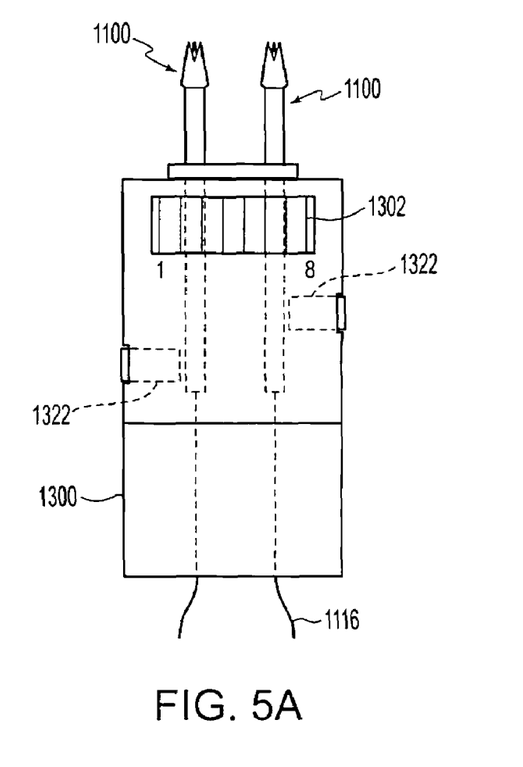
FIGS. 5A-5B are a bottom plan view and a front plan view, respectively, of an RJ-45 connector that includes two of the pogo-style out-of-band channel connectors depicted in FIG. 3.
Figure 5B:
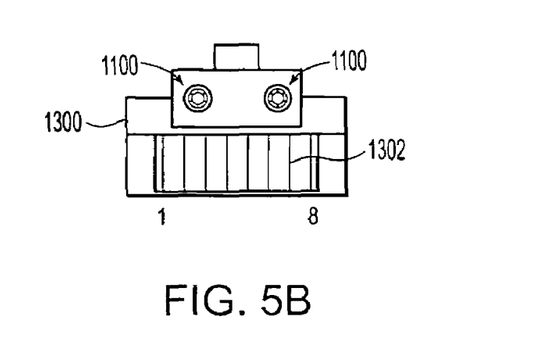

FIGS. 5A-5B are a bottom plan view and a front plan view, respectively, of an exemplary RJ-45 style connector that includes a pogo-style out-of-band channel connector as described above with respect to FIG. 3. As shown in FIG. 5A-5B, two pogo-style connectors 1100 may be inserted within an RJ-45 style connector 1300 without disturbing the configuration of standard RJ-45 connectors 1302. Each pogo-style connector 1100 may be connected to a conductor 1116, as described above and then inserted into RJ-45 style connector 1300, held in place by a tight friction fit and/or locked in place by known locking devices 1322 against the pogo-style connectors.

RJ-45 style connectors as shown in FIGS. 4A-B and FIGS. 5A-B may be used to create an improved pogo-style electrical contact with an electrical conducting pad by scraping away debris and oxidation from the electrical contact surfaces each time the RJ-45 style connector is inserted into a patch panel port. Rotation of the contact lead as the lead retracts under pressure from resilient member 1112 assures that the multipoint contacts scrape against the contact pad with sufficient force to clear debris and oxidation. The points within the multi-point contact may be arranged so that, as the contact lead rotates, one or more points rotate about central axis 1126 as at a different offset 1128. Arranged in such a manner, points located at the same offset distance from central axis 1126 may scrap the surface of the conductive contact pad in the same circular path. Thus, if a single scraping point, or edge, is position a predetermined distance from central axis 1126, rotation of contact lead 1102 by just over 360° assures that the point may come to rest against a location on the contact pad that has been previously scraped. Further, if two points are arranged in the same circular path, rotation of the contact lead by just over 180° assures that each point may come to rest against a location on the contact pad that has been scraped by the other point on the multi-point. Similarly, if three points are arranged in the same circular path, rotation of the contact lead by just over 120° assures that each point may come to rest against a location on the contact pad that has been scraped clean by another point on the multi-point. Although FIGS. 3, 4A-4B, and 5A-5B depict exemplary multi-point contacts with three contact points arranged in a single rotational path, multi-point contact surfaces may include any number of contact points shaped in any manner to facilitate the scraping away and removal of debris and oxidation. Further, to increase the total contact pad surface area that is scraped clear of debris and oxidation, sets of multi-point contacts may be arranged within a multi-point contact surface in multiple rotational paths.

Contact surface 1104 may have any shape that facilitates the cleaning of a contact pad surface based upon a rotation of contact surface 1104 and is not limited to a multipoint contact surface. For example, contact surface 1104 may include one or more chisel-style edges that radiate across the diameter and/or the radius of the contact surface 1104. In such an exemplary embodiment, the number and configuration of scraping surfaces may determine the number of rotations needed to scrape the contact surface clean. Further, contact surface 1104 may include a relatively flat smooth, rough, or part-smooth and part-rough surface that rubs against a contact pad surface to obtain a good electrical contact.

Figure 6:
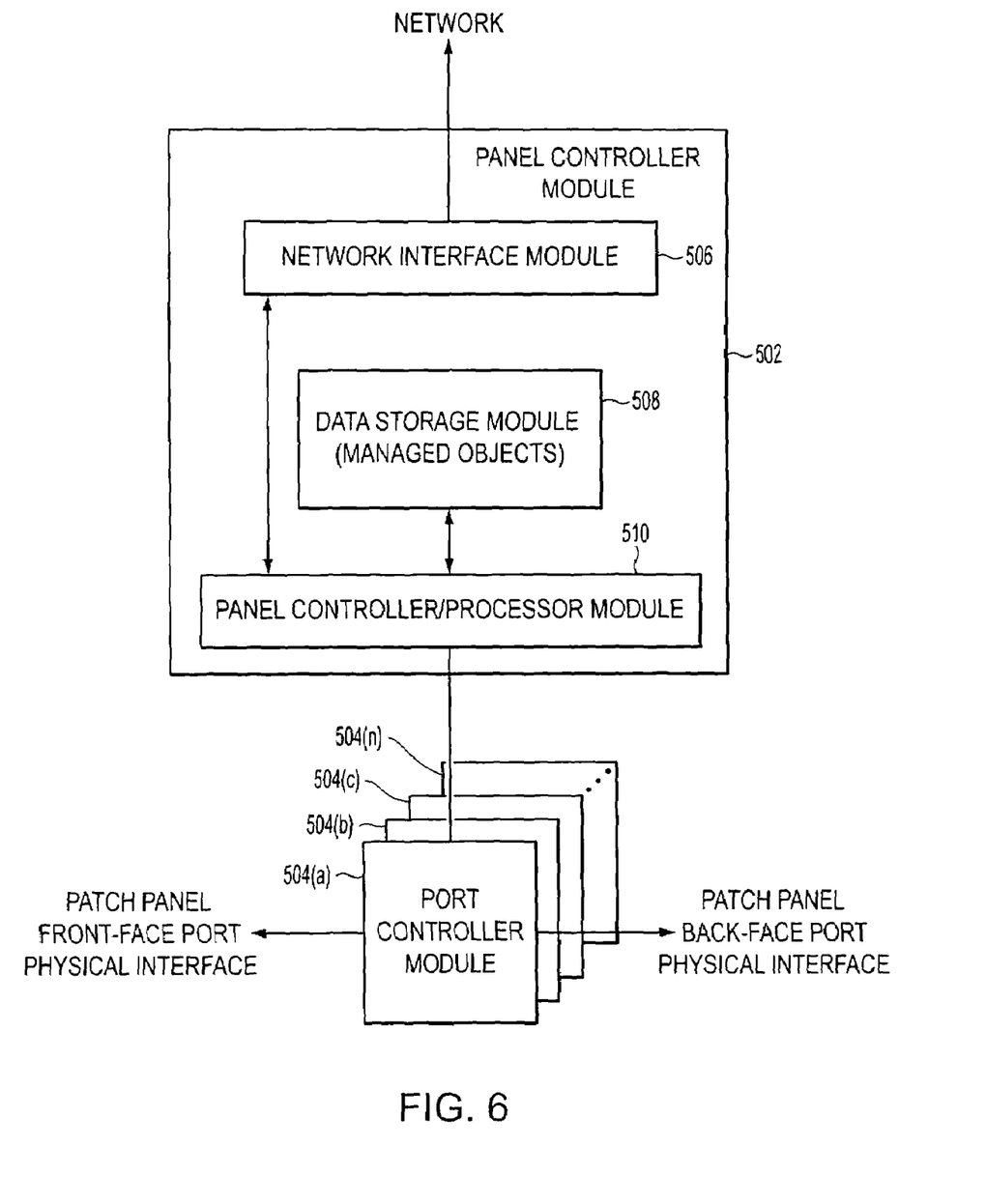
FIG. 6 is a block diagram of an exemplary modular patch panel that includes AC signaling upon an out-of-band channel in support of patch panel patch cord connectivity monitoring.

FIG. 6 is a block level diagram of an exemplary modular intelligent patch panel, or I-Panel configuration. Additional description related to exemplary features and capabilities of the I-Panel patch panel system is included in the co-pending U.S. Patent Application, entitled "Method and Apparatus for Modular Network Cable Management." and co-pending U.S. Patent Application, entitled "Method and Apparatus for Monitoring Physical Network Topology Information." incorporated, above, into the present application by reference in their entireties.

Exemplary I-Panel embodiments may perform network cable management functions, in part, by monitoring the connection status of network cables attached to the I-Panel patch cord/network cable interface. The I-Panel may monitor network cable/patch cord connectivity by monitoring an out-of-band channel supported by an additional conductor (e.g. a ninth wire) added to a network cable/patch cord. In such an exemplary I-panel embodiment, the ability of the I-Panel to monitor a network cable connection relies upon the electrical connectivity and reliability of the $9^{th}$ wire that supports the network cable connection status monitoring process. The presence of capacitive leads, as described above, may significantly affect the effectiveness and accuracy of such a network cable connection monitoring process in which the out-of-band channel relies upon DC-based signaling. Therefore, use of AC signaling and an improved pogo-style connection, as described above, upon the $9^{th}$ wire that supports the I-Panel network cable monitoring may significantly improve the accuracy and reliability of the monitoring process.

As shown in FIG. 6, an exemplary I-Panel configuration may include a panel controller module 502. The panel controller module 502 may include or communicate with a panel controller/processor module 510 in communication with a data storage module 508, a network interface module 506 and a plurality of port controller modules 504(a)-(n).

Panel controller/processor module 510 may communicate with each of the respective port controller modules 504(a)-(n) to receive port status updates and to transmit port configuration parameters used to control operation of the respective I-Panel ports with which each of the respective port controller modules 504(a)-(n) is associated. Upon receipt of an update message from a port controller module 504, panel controller/processor module 510 may update status information stored within data storage module 508, generate an update message that includes network cable connection-related information received from the port controller module, and transmit the generated update message to a remote network-connected NMS via network interface module 506.

Figure 7:
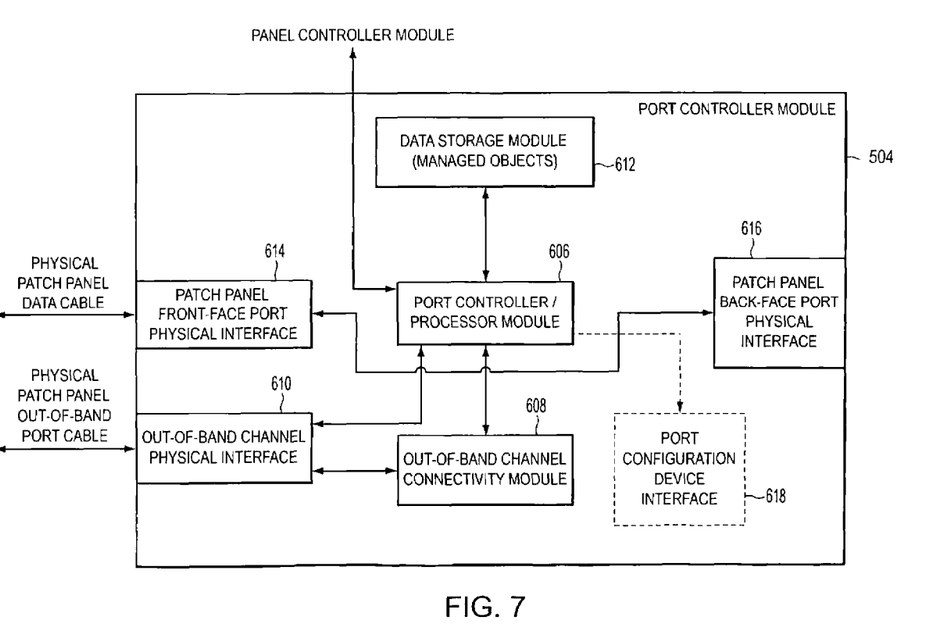
FIG. 7 is a block diagram of an exemplary port controller module as depicted in FIG. 6.

FIG. 7 is a block diagram of an exemplary port controller module 504 as depicted in FIG. 6. As shown in FIG. 7, port controller module 504 may include a port controller/processor module 606 in communication with an out-of-band channel connectivity module 608 and a data storage module 612. Port controller/processor module 606 may further communicate directly, or via out-of-band channel connectivity module 608, with an out-of-band channel physical interface 610, and may communicate with an optional port configuration device interface 618 (indicated in FIG. 7 with dashed lines). As shown in FIG. 7, port controller/processor module 606 does not necessarily monitor, or affect in any way, data passing through the port controller module 604 via patch panel front-face port physical interface 614 and patch panel back-face port physical interface 616. However, in other embodiments (e.g., embodiments in which port controller module 604 is configured as a repeater, etc.,), a data signal passing through port controller module 604 may be processed in some manner (e.g., the magnitude, or phase, of the signal may be measured, the magnitude of the signal may be amplified, etc.) as the signal passes through port controller module 604. For example, in one such embodiment, the port controller/processor module 606 may monitor the magnitude, phase, and/or other characteristics, of a received signal via the front-face port physical interface 614 or back-face port physical interface 616 and store that information for later use, as described below, and/or report information related to the signal to panel controller module 502 (See FIG. 6), as described below.

Port controller/processor module 606 may communicate with the I-Panel panel controller module 502 (FIG. 6) to send port update messages to the panel controller module and to receive configuration/control parameter updates from the panel controller module. Upon receipt of an update message from the panel controller module, port controller/processor module 606 may update status information stored within data storage module 612. Port controller/processor module 606 may use parameters (e.g., patch panel/port identification information, a signal magnitude threshold, phase change threshold, or capacitance threshold, etc.) received from the I-Panel panel controller module and stored in data storage module 612 to control operation of port controller module 504 with respect to actions performed by the port controller module to control events monitored by port controller module 504 and to control events reported via update messages to the panel controller module.

In one exemplary port controller module, port controller/processor module 606 may retrieve from data storage module 612 a local patch panel identifier, a local port identifier and a local port connection status associated with the current, or local, port controller module (e.g., I-Panel/port information related to the current, or local. I-Panel port) and may provide the retrieved information to out-of-band channel connectivity module 608. Out-of-band channel connectivity module 608 may then generate an outbound port message that includes the retrieved local patch panel identifier and local port identifier information and may proceed to transmit the message upon the out-of-band channel via a transmitter operated by out-of-band channel physical interface 610. Further, out-of-band channel connectivity module 608 may receive an inbound message from a remote port that includes a remote patch panel identifier and a remote port identifier information, as described above with respect to FIG. 1, via a receiver operated by out-of-band channel physical interface 610.

Upon determining, based upon the monitored out-of-band messages, that a change in port level connectivity has occurred, out-of-band channel connectivity module 608 may notify port controller/processor module 606. Port controller/processor module 606 may store the updated status information in data storage module 612 and send an update message to the panel controller module, as described above.

In an exemplary configuration in which out-of-band channel physical interface 610 supports a single out-of-band conductor, out-of-hand channel connectivity module 608 may repeatedly alternate between transmitting an outbound port message and checking to see if an inbound message from a remote port may be received. For example, in an RJ-45 style network cable RJ-45, such an approach may be used by an out-of-band channel supported by a single $9^{th}$ wire added to the network cable, as described above with respect to FIGS. 4A-4B. In another exemplary configuration in which out-of-band channel physical interface 610 supports two separate out-of-band conductors, out-of-band channel connectivity module 608 may simultaneously transmit an out-of-band outbound port message and check for/receive an out-of-band message from a remote port, simultaneously. For example, in an RJ-45 style network cable RJ-45, such an approach may be used by an out-of-band channel supported by a $9^{th}$ and $10^{th}$ wire added to the network cable, as described above with respect to FIGS. 5A-5B.

Such an exemplary connectivity monitoring system, as described above, is very sensitive to the quality of the cable contacts (e.g., the $9^{th}$ and $10^{th}$ wires). As described above, a layer of insulating oxide may build up on and act as a dielectric between the conductive contact surfaces of the cable terminator (e.g., an RJ-45 plug) and the conductive contact surfaces of the socket within which the cable terminator is inserted, resulting in a capacitive contact. In a system that uses conventional DC signaling, a capacitive contact may significantly impact the accuracy of the connectivity information produced. As described above, a DC signal cannot penetrate a capacitive contact, and low-frequency signaling cannot effectively communicate when a capacitive contact is in series with the communicating electronics. Fortunately, a communication device, such as the exemplary I-Panel embodiment described above, may be modified to communicate over the out-of-band connection using the AC signal-based approach described above.

In one exemplary I-Panel embodiment, the out-of-band channel physical interface, described above with respect to FIG. 7, block 610, may be configured to transmit and receive AC signals. Such an enhancement would mitigate the effect of capacitive connections within monitored network cables and improve the ability of the I-Panel to detect the presence of established network cable connections.

In one exemplary embodiment, the out-of-band channel physical interface 610 associated with a local I-Panel device may communicate via the out-of-band channel with the out-of-band channel physical interface 610 associated with a remote I-Panel device to determine a frequency that provides each respective I-panel device with a detected signal ($Vs_{received}$) within a predetermined signal strength range. In such an exemplary embodiment, the signal transmitter controlled by local out-of-band channel physical interface 610 may be capable of transmitting AC signals within a range of frequencies and the receiver controlled by remote out-of-band channel physical interface 610 may be capable of receiving signals within the same range of frequencies. Such an approach may be used to assure that a strong signal is received upon the out-of-band channel by a remote I-Panel and further may be used to determine the amount of impedance upon the network cable connecting the local I-panel with the remote I-Panel device.

For example, a local I-Panel may begin transmissions upon the out-of-band channel at a first predetermined and/or user configurable frequency, that may be chosen by an operator based upon a physical assessment of the general age and condition of the cable network cables. For example, such an initial selected frequency may be based upon an estimate by the operator of a level of impedance present upon a portion of the network cables. Alternately, such a selected frequency may be based upon the highest frequency that a port transmitter is capable of physically transmitting and/or the highest frequency that the transmitter is capable of transmitting without introducing parasitic interference within the network.

In one exemplary configuration, after failing to receive a response, the I-Panel out-of-band channel physical interface 610 may instruct the transmitter to transmit at an increased frequency. Such a process may repeat until the transmitted frequency has been instructed to transmit signals, for a predetermined or user configurable period of time, upon each of the frequencies that the transmitter can support. After transmitting a signal at the highest frequency that the transmitter is capable of transmitting, the cycle may repeat.

After establishing contact with a remote I-Panel, the remote I-Panel may communicate to the local I-Panel (in addition to other information described above) a measured magnitude of the signal as received ($Vs_{received}$) by the remote I-Panel. Based upon the value of $Vs_{received}$ reported by the remote I-Panel the local I-Panel may transmit at an increased frequency until the remote I-Panel reports a $Vs_{received}$ that is within a predetermined and/or user configurable target range. Based upon the relationships defined by Equations 1-4, such a determined frequency may be used by I-Panel out-of-band channel physical interface 610 to determine the resistive capacitance upon the network cable.

In another exemplary embodiment, the signal transmitter controlled by local out-of-band channel physical interface 610 and the signal transmitter controlled by local out-of-band channel physical interface 610 may be configured to transmit, at a single predetermined frequency, an AC signal with a predetermined maximum amplitude. In such an exemplary embodiment, each of the respective local and remote out-of-band channel physical interfaces may determine the level of impedance upon the network cable based upon the magnitude of the signal received.

In the exemplary embodiments described above, user-configurable control parameters may be stored by port controller 504 (FIG. 6 and FIG. 7) in data storage module 612 (FIG. 7) after having been received from a network management system or other network-connected control system via network interface module 506 and panel controller/processor module 510 within the I-Panel panel controller module 502 (FIG. 6). In other embodiments, configuration values may be received by port controller 504 via one of patch panel front-face port physical interface 614 or out-of-band channel physical interface 610 from a transportable field technician maintenance terminal.

As described above, use of an AC signal may improve the connectivity upon a physical network cable suffering from a capacitive connections. Further, the value of $Vs_{received}$ may be used to assess the magnitude of impedance upon a line and thereby to identify network cables in need of replacement and/or to plan and/or schedule network cable replacements.

Referring again to FIG. 7, upon determining the magnitude of a received signal and/or the level of impedance upon a network cable, out-of-band channel physical interface 610 may report the determined values via out-of-band channel connectivity module 608 to port controller/processor module 606. Port controller/processor module 606 may store the determined values in data storage module 612 and further report the impedance value to panel controller/processor module 510 (FIG. 6) in panel controller module 502. Panel controller/processor module 510 may store the determined values in data storage module 508 and further report the impedance value via network interface module 506 to an NMS via the network.

Further, the I-Panel panel controller and/or NMS may determine new control parameters (e.g., a new AC signal frequency, new port outbound message content, etc.) in response to the information received. These updated control parameters may be transmitted from the NMS to the I-Panel patch panel controller and/or to the I-Panel port controller, as described above, and used to control the transmission and receipt of subsequent out-of-band channel AC signals and/or the message content transported by the respective AC signals.

The NMS may be configured to receive and store reported impedance values over time and may generate reports that track changes in impedance over the respective network cable over time and project/schedule repairs and/or replacement of cables that have degraded and/or, based upon the tracked rate of degradation, may soon degrade below a predetermined and/or user-configurable impedance threshold level.

Figure 8:
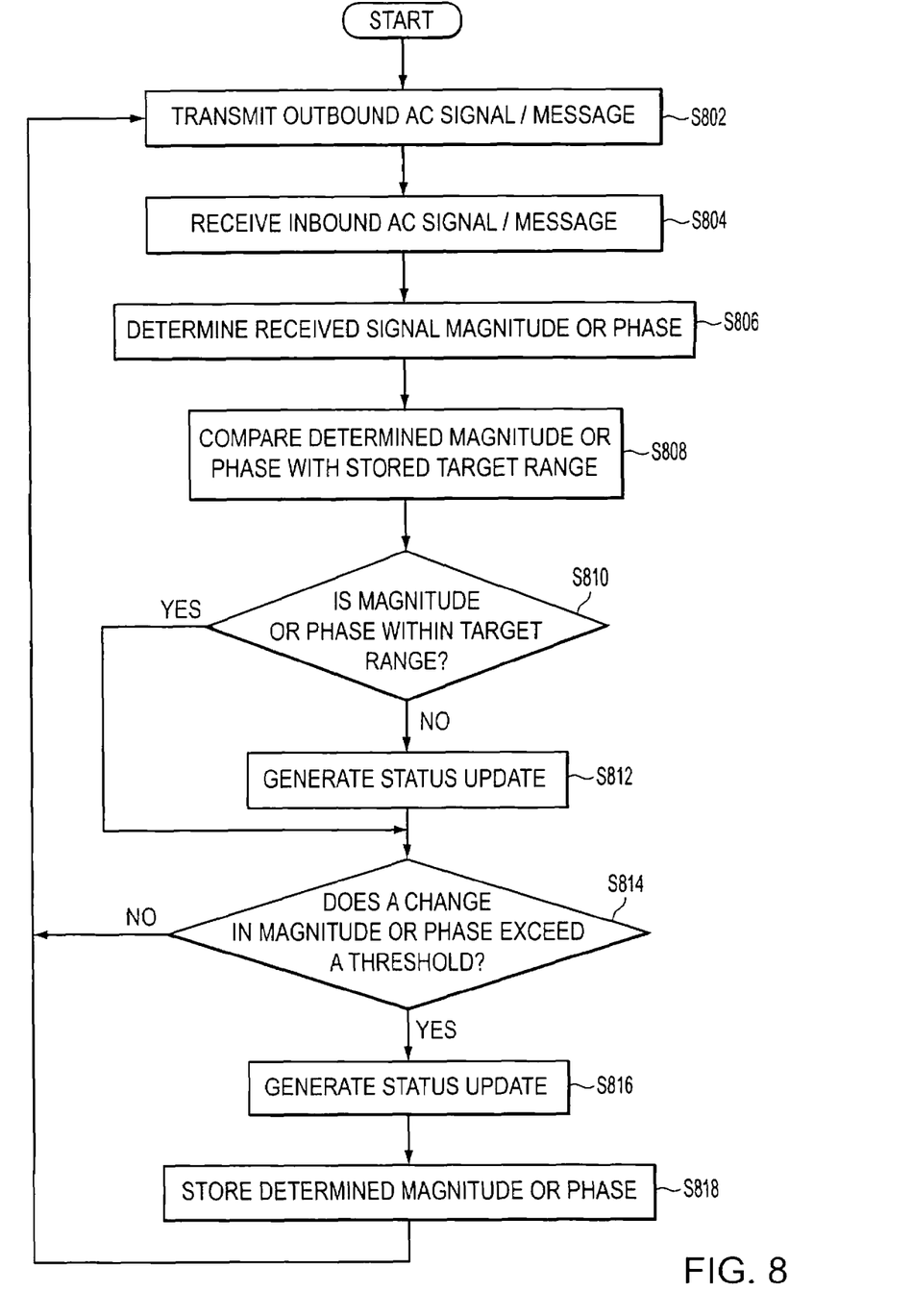
FIG. 8 is an exemplary flow chart of the workflow associated with use of AC signaling in the exemplary modular patch panel depicted in FIG. 6.

FIG. 8 is an exemplary flow chart of the process workflow associated with the use of AC signaling in an exemplary network-connected device (such as the I-Panel system, as described above). As shown in FIG. 8, upon initiation, or startup, an exemplary network connected device may transmit, at step S802, an outbound AC signal. The outbound AC signal may include a message that contains configuration parameters stored within the device (e.g., a device identifier, a port identifier, etc.). Further, the frequency of the AC signal transmitted may be based upon a stored transmission frequency control parameter. Such stored parameters may be predetermined, user configurable, or dynamically maintained, as described above. The network-connected device may also receive, at step S804, an inbound AC signal generated by another network-connected device configured to support similar AC-based signaling. Receipt of an inbound signal may be performed sequentially, in parallel, or multiplexed with transmission of an AC signal, depending upon the number of out-of-band conductors used and/or the configuration of the transmitter, receiver and control modules supporting AC-based signaling, as described above.

Many of the benefits associated with AC signal-based transmissions may be achieved based upon workflow process steps S802 and S804, only. For example, in a configuration that supports a single status AC signal frequency, the network connected devices may be designed and pre-configured to transmit and receive a signal frequency that supports improved electrical connectivity for a selected range of impedances, as described above with respect to Equations 1-4. However, in other exemplary embodiments, one or more of the respective network devices may support additional signal processing capabilities and/or be capable of transmitting and/or receiving more than a single AC frequency. Such exemplary embodiments may include control functions capable of dynamically updating the AC signal frequency and/or message content based upon information contained within and/or derived from a monitored AC signal connection.

For example, as shown in FIG. 8, upon receiving an inbound AC signal, a network device may determine, at step S806, the magnitude and/or phase of the received signal. The magnitude and/or phase of a received signal may be compared, at step S808 with a previously stored received signal magnitude and/or phase, respectively. If the magnitude and/or phase of the received signal is determined, at step S810, to be within a pre-determined, or user-configurable range, processing may proceed to step S814. Otherwise, if the magnitude and/or phase of the received signal is determined, at step S810, to not be within a pre-determined, or user-configurable range, the device may generate, at step S812, a status update message that may include the magnitude and/or phase and/or frequency of the received signal and transmit the status update message, either directly or indirectly to a device controller within the network connected device and/or to a remote NMS via the network. Upon transmission of such a status update, processing may proceed to step S814.

Although not shown in FIG. 8, the device controller and/or NMS may receive and process the status update message and update, either directly or indirectly, control parameters within the network connected device. By way of a first example, in an exemplary embodiment in which the network connected device transmits the magnitude and/or phase and/or frequency of a received signal upon the transmitted outbound AC signal, the NMS and/or device controller may update the network device control parameters that control the message content and/or frequency of the transmitted outbound AC signal. By way of a second example, based upon the magnitude and/or phase of the signal received, the controller and/or NMS may monitor the operational efficiency of the respective network cables. Depending upon the magnitude and/or phase of the received signal, for example, the NMS may schedule a network cable for replacement.

Referring again to FIG. 8, upon determining, at step S814, that a calculated change in the magnitude and/or phase (e.g., a calculated difference between the received magnitude and/or phase and the previously stored magnitude and/or phase) of a received signal has exceeded a predetermined or user-configurable threshold value, the network device may generate, at step S816, a status update message that includes the magnitude of the received signal and may transmit the status update message, either directly or indirectly to a controller within the network-connected device and/or to a remote NMS via the network and store, at step S818, the new received magnitude or phase for use in future comparisons (e.g., at block S814). Otherwise, if the calculated change in the magnitude or phase is determined, at step S814, not to have exceeded the threshold value, processing may return to step S802. Although not shown in FIG. 8, the device controller and/or NMS may receive and process the status update message generated at step S816 and may update, either directly or indirectly, control parameters within the network-connected device, as described above. In this manner, operation of port transmissions may be centrally controlled in accordance with a centralized analysis process with access to additional data and processing capabilities and in accordance with a centralized management policy.

It will be appreciated that the exemplary embodiments described above and illustrated in the drawings represent only a few of the many ways of implementing AC signal-based communication over a network cable for use in establishing a highly reliable network cable connection. The present invention is not limited to use with any specific network devices, but may be used to improve communication between any devices that communicate over a network cable.

The AC signal-based communication methods and apparatus may be implemented in any number of hardware and software modules and are not limited to any specific hardware/software module architecture. Each AC signal-based communication module may be implemented in any number of ways and is not limited in implementation to execute process flows precisely as described above. The AC signal-based communication methods and apparatus described above and illustrated in the flow charts and diagrams may be modified in any manner that accomplishes the functions described herein.

It is to be understood that various functions of the AC signal-based communication methods and apparatus may be distributed in any manner among any quantity (e.g., one or more) of hardware and/or software modules or units, computers or processing systems, or circuitry.

The AC signal-based communication methods and apparatus may support any network device that supports any type of electrically conducting network cable. The RJ-45 based embodiments described above are exemplary only. Any type of electrically conducting cable and/or cable terminator is compatible with the described AC signal-based communication methods and apparatus.

The described AC signal-based physical connection monitoring methods and apparatus are not limited to use over an out-of-band physical connection (e.g., a ninth-wire added to a four pair network cable), but may be used to assess the impedance of any, or all, of the conductors within a network cable, so long as the AC frequency used to monitor the status of the physical cable connection does not interfere with the transmission of network protocol data signals on the same or other conductors within the network cable. Such an embodiment may be implemented in a manner similar to that for an exemplary out of band (e.g. $9^{th}$ wire) embodiment, as described above, except that the AC monitoring signal may be transmitted over one or more conductors attached to patch panel front-face port physical interface 614 and/or patch panel back-face port physical interface 616. For example, in an Ethernet based network, the described techniques may be used to monitor the integrity of any or all network cable conductors, so long as the AC frequency used to monitor conductor integrity does not interfere with (e.g., is outside the frequency range of) Ethernet data signals transmitted over the conductors being dynamically monitored. Further, common mode detection techniques may be employed to detect changes in connectivity (e.g., on conductors that support an Ethernet data signal) without disturbing the Ethernet data signal. Such common mode techniques may not require the application of a monitoring AC signal.

Network Management System processes associated with the AC signal-based communication methods and apparatus may be integrated within a stand-alone system or may execute separately and be coupled to any number of devices, workstation computers, server computers or data storage devices via any communication medium (e.g., network, modem, direct connection, etc.). The Network Management System processes associated with the AC signal-based communication methods and apparatus may be implemented by any quantity of devices and/or any quantity of personal or other type of computers or processing systems (e.g. IBM-compatible. Apple. Macintosh, laptop, palm pilot, microprocessor, etc.). The computer system may include any commercially available operating system (e.g. Windows. OS/2, Unix, Linux. DOS, etc.), any commercially available and/or custom software (e.g., communication software, traffic analysis software, etc.) and any types of input/output devices (e.g., keyboard, mouse, probes. I/O port, etc.).

It is to be understood that the AC signal-based communication methods and apparatus and the Network Management System software associated with the AC signal-based communication methods and apparatus may be implemented in any desired computer language, and could be developed by one of ordinary skill in the computer and/or programming arts based on the functional description contained herein and the flow charts illustrated in the drawings. For example, in one exemplary embodiment the AC signal-based communication methods and apparatus may be written using the C+ programming language, however, the present invention is not limited to being implemented in any specific programming language. The various modules and data sets may be stored in any quantity or types of file, data or database structures. Moreover, the software associated with the AC signal-based communication methods and apparatus may be distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

The format and structure of internal structures used to hold intermediate information in support of the AC signal-based communication methods and apparatus may include any and all structures and fields and are not limited to files, arrays, matrices, status and control booleans/variables.

The Network Management System used to support the AC signal-based communication methods and apparatus software may be installed and executed on a computer system in any conventional or other manner (e.g., an install program, copying files, entering an execute command, etc.). The functions associated with the Network Management System may be performed on any quantity of computers or other processing systems. Further, the specific functions may be assigned to one or more of the computer systems in any desired fashion.

The AC signal-based communication methods and apparatus may accommodate any quantity and any type of data set files and/or databases or other structures containing stored data sets, measured data sets and/or generated data sets in any desired format (e.g. ASCII, plain text, any word processor or other application format, etc.).

Correlated output related to the AC signal-based communication methods and apparatus may be presented to the user (e.g., via the Network Management System) in any manner using alphanumeric and/or visual presentation formats. Output analysis may be presented in either alphanumeric or visual form and may be processed by the NMS in any manner and/or using any number of threshold values and/or rule sets.

Further, any references herein to software performing various functions generally refer to computer systems or processors performing those functions under software control. The computer system may alternatively be implemented by hardware or other processing circuitry. The various functions of the AC signal-based communication methods and apparatus may be distributed in any manner among any quantity (e.g., one or more) of hardware and/or software modules or units, computer or processing systems or circuitry, where the computer or processing systems may be disposed locally or remotely of each other and communicate via any suitable communication medium (e.g. LAN. WAN, Intranet, Internet, hardwire, modem connection, wireless, etc.). The software and/or processes described above and illustrated in the flow charts and diagrams may be modified in any manner that accomplishes the functions described herein.

It is to be understood that the approaches and methods described above with respect to an AC signal-based communication methods and apparatus and an improved pogo-style connector apparatus and method may be implemented jointly or separately as integral components of any network cable based communication device, and are not limited to use within the exemplary I-Panel patch panel embodiments described above. For example. AC signal-based out-of-band signaling apparatus and method, as described above, may be used within any cable-based connection to mitigate the effect of capacitive contacts. The improved pogo-style connector apparatus and method may be used in place of any conventional pogo-style connector.

From the foregoing description it will be appreciated that an AC signal-based out-of-band signaling apparatus and method and an improved pogo-style connector apparatus and method are disclosed that are capable of providing highly reliable network cable connections.

While specific exemplary embodiments of AC signal-based communication methods and apparatus and use of an improved pogo-style connector apparatus and method are disclosed, these exemplary embodiments should be viewed as illustrative, not limiting. Various modifications, improvements, and substitutes are possible within the scope of the present invention. Although specific terms are employed herein, they are used in their ordinary and accustomed manner only, unless expressly defined differently herein, and not for purposes of limitation.

What is claimed is:

1. A method for monitoring a connectivity of a network cable, comprising:
   (a) transmitting an AC signal upon at least one conductor of the network cable;
   (b) receiving an AC signal upon at least one conductor of the network cable;
   (c) determining a connectivity of the network cable based upon the received AC signal;
   (d) sending a status update message to a network management system that includes the connectivity of the network cable;
   (e) increasing a frequency of the transmitted AC signal upon failing to receive an AC signal within a prescribed period of time;

(f) determining at least one of a magnitude and a phase of the received AC signal;

(g) sending a status update to at least one of a central controller and a remote network management system that includes information related to the determined at least one of magnitude and chase of the received AC signal (h) receiving from at least one of the central controller and the remote network management system a control update containing an updated control parameter in response to the status update; and (i) changing at least one of a message transmitted by the transmitted AC signal and a frequency of the transmitted AC signal in response to the received control parameter update.

2. A method of claim 1, further comprising:

A method for monitoring a connectivity of a network cable, comprising:

(a) transmitting an AC signal upon at least one conductor of the network cable;

(b) receiving an AC signal upon at least one conductor of the network cable;

(c) determining a connectivity of the network cable based upon the received AC signal:

(d) sending a status update message to a network management system that includes the connectivity of the network cable;

(e) increasing a frequency of the transmitted AC signal upon failing to receive an AC signal within a prescribed period of time;

(f) determining a magnitude of an impedance upon the at least one conductor of the network cable upon which the received AC signal is received;

(g) sending a status update to at least one of a central controller and a remote network management system that includes information related to the determined magnitude of impedance;

(h) receiving from at least one of the central controller and the remote network management system a control parameter update containing an undated control parameter in response to the status update; and (i) changing at least one of a message transmitted by the transmitted AC signal and a frequency of the transmitted AC signal in response to the received control parameter update.

3. An apparatus for monitoring connectivity of a network cable, comprising:

a transmitter that transmits an AC signal upon at least one conductor of the network cable;

a receiver that receives an AC signal upon at least one conductor of the network cable;

a processor that is coupled to the transmitter and the receiver and determines a status of the network cable based upon the received AC signal; and a control module that increases the frequency of the transmitted AC signal upon failing to receive an AC signal within a prescribed period of time;

wherein the processor determines a magnitude of an impedance upon the least one conductor of the network cable upon which an AC signal is received and wherein the processor further comprises;

a network interface that sends a status update to at least one of a central controller and remote network management system that includes information related to the determined magnitude of impedance;

wherein the processor receives a control update containing an updated control parameter from at least one of the central controller and the remote network management system in response to the status update and wherein the processor further comprises:

a control module that changes at least one of a message transmitted by the AC signal and a frequency of the transmitted AC signal in response to the received control parameter update.

* * * * *

UNITED STATES PATENT AND TRADEMARK OFFICE
CERTIFICATE OF CORRECTION

PATENT NO. : 7,411,405 B2
APPLICATION NO. : 11/423809
DATED : August 12, 2008
INVENTOR(S) : Ronald A. Nordin It is certified that error appears in the above-identified patent and that said Letters Patent is hereby corrected as shown below:

Col. 15, Claim 2, line 1, delete "A method of claim 1, further comprising:"

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,411,405 B2 Page 1 of 1
APPLICATION NO. : 11/423809
DATED : August 12, 2008
INVENTOR(S) : Ronald A. Nordin It is certified that error appears in the above-identified patent and that said Letters Patent is hereby corrected as shown below:

Col. 15, Claim 2, line 16, delete "A method of claim 1, further comprising:"

This certificate supersedes the Certificate of Correction issued December 9, 2008.

Signed and Sealed this

Thirtieth Day of December, 2008

JON W. DUDAS
*Director of the United States Patent and Trademark Office*